United States Patent
Mesaros et al.

(10) Patent No.: US 8,963,891 B2
(45) Date of Patent: Feb. 24, 2015

(54) METHOD AND APPARATUS FOR DRAWING TOOL SELECTION

(75) Inventors: Mark David Mesaros, Cambridge (CA); Jasmin Mulaosmanovic, Waterloo (CA)

(73) Assignee: BlackBerry Limited, Ontario (CA)

( * ) Notice: Subject to any disclaimer, the term of this patent is extended or adjusted under 35 U.S.C. 154(b) by 226 days.

(21) Appl. No.: 13/456,275

(22) Filed: Apr. 26, 2012

(65) Prior Publication Data

US 2013/0286033 A1    Oct. 31, 2013

(51) Int. Cl.
*G06F 3/033*    (2013.01)

(52) U.S. Cl.
USPC .......................................................... 345/179

(58) Field of Classification Search
USPC .......................................................... 345/179
See application file for complete search history.

(56) References Cited

U.S. PATENT DOCUMENTS

| | | | |
|---|---|---|---|
| 5,959,616 A | 9/1999 | Challener | |
| 6,654,008 B2 | 11/2003 | Ikeda et al. | |
| 7,646,379 B1 * | 1/2010 | Drennan et al. | 345/177 |
| 7,692,639 B2 | 4/2010 | Silverstein et al. | |
| 2002/0080125 A1 | 6/2002 | Ikeda et al. | |
| 2004/0246240 A1 | 12/2004 | Kolmykov-Zotov | |
| 2005/0024346 A1 | 2/2005 | Dupraz et al. | |
| 2005/0117073 A1 | 6/2005 | Payne et al. | |
| 2007/0094328 A1 * | 4/2007 | Birch | 709/204 |
| 2011/0007037 A1 * | 1/2011 | Ogawa | 345/179 |
| 2011/0116856 A1 * | 5/2011 | Lapstun et al. | 401/45 |
| 2012/0105383 A1 * | 5/2012 | Silverbrook et al. | 345/179 |

FOREIGN PATENT DOCUMENTS

| | | |
|---|---|---|
| JP | 61-237123 | 10/1986 |
| WO | WO 2004063862 | 7/2004 |

OTHER PUBLICATIONS

European Search Report, EP12165611, Sep. 25, 2012.

* cited by examiner

*Primary Examiner* — Aneeta Yodichkas
*Assistant Examiner* — Brent D Castiaux

(57) ABSTRACT

The present disclosure provides a method, system and stylus for drawing tool selection. One or more drawing tool settings, each defined by user-selectable drawing tool attributes, are formed by user interaction with a user interface. A user-activated control on a stylus signals a host electronic device to select a drawing tool setting. The settings may be selected in cyclic order. When a selected drawing tool setting includes color, the host electronic device may signal the selected color to the stylus for display using a color indicator on the stylus.

21 Claims, 5 Drawing Sheets

METHOD AND APPARATUS FOR DRAWING TOOL SELECTION

BACKGROUND

Stylus pointing devices are used to convey position information to an electronic device. However, unlike a computer mouse that conveys relative motion, a stylus is designed to convey the absolute position of the stylus on a surface such as a tablet or screen. The position may be determined by a variety of methods, including detecting the interaction of the stylus with the electrical properties of the tablet (electromagnetic induction, electrical resistance, electrical capacitance), the optical properties of the tablet, or by ultrasonic location.

An active stylus has an ability to communicate with the electronic device over a wired link or over a wireless communication link, such as a Radio-Frequency (RF) or Infrared (IR) link.

A stylus may be used in conjunction with a graphical user interface to enable user input to the electronic device.

A common use of a stylus is to provide user input to a computer aided drawing or handwriting application. In this application the stylus is used both to draw lines and to interact with a user interface. Selection of the properties of the line is achieved by using the stylus to interact with a graphical user interface. For example, the color or thickness of a line to be drawn may be selected by touching ('clicking') the stylus to a particular region of the screen or tablet. Alternatively, the color or thickness or a line may be selected by using the stylus to move a screen cursor to a particular region of the screen. A similar approach is used to select other properties of the line to be drawn.

It would be useful to provide a faster and more intuitive method for selecting line properties or other parameters. One approach is to provide one or more buttons on the body on the stylus and to assign each button to a particular color. However, there are a great number of colors available and many other line properties that may be selected. This approach is limited since it is only practical to have a relatively small number of buttons on a stylus.

BRIEF DESCRIPTION OF THE DRAWINGS

Example embodiments of the present disclosure will be described below with reference to the included drawings such that like reference numerals refer to like elements and in which.

DETAILED DESCRIPTION

The present disclosure provides a method, system and stylus for selecting the attributes of a computerized drawing tool on a host electronic device. In one embodiment, the attributes are selected by first selecting a plurality of attributes on a user interface of the host electronic device. The attributes, in combination, define one or more first settings of the computerized drawing tool. Responsive to a first signal received by the host electronic device from a stylus, the host electronic device cycles through the one or more first settings of the computerized drawing tool to select a setting of the one or more first settings.

When a selected drawing tool setting includes color, the host electronic device may signal the selected color to the stylus for display using a color indicator, such as an LED, on the stylus.

Figure 1A:
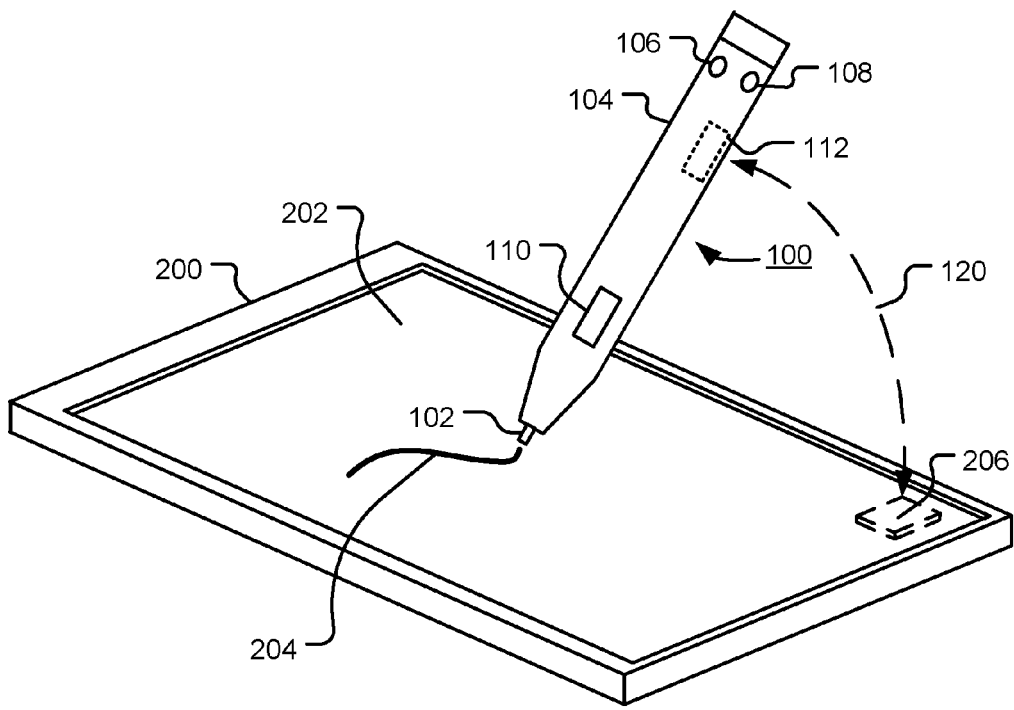
FIG. 1A is a diagram of a stylus and host electronic device, in accordance with various example embodiments of the present disclosure.

FIG. 1A is a diagram of a stylus 100 and host electronic device 200, in accordance with various example embodiments of the present disclosure. Referring to FIG. 1A, the stylus 100 is operable to interact with the host electronic device 200. In operation, the position of the stylus tip element 102, which extends from the elongated housing 104 of the stylus 100, relative to the surface of the host electronic device is detected and may be used to control the electronic device. For example, the stylus may be an active stylus that emits a signal that is detected by sensors in the electronic device 200. Alternatively, the stylus may detect signals emitted from sources in the electronic device. The signals may be, for example, electromagnetic, acoustic, optical, or a combination thereof. Various position detection methods are known, or will be apparent, to those of ordinary skill the art.

The stylus 100 may have one or more controls such as button 106 and button 108, a color indicator 110 and a communication unit 112. The color indicator 110 may be an illumination source, such as a light emitting diode (LED), for example, or other kind of indicator. In operation, user activation of a control (106 or 108) causes a selection signal 120 to be transmitted from the communication unit 112.

In one embodiment, the upper surface 202 of the electronic device comprises a visual display screen. An image 204 may be displayed on the visual display screen 202 dependent upon the position of the tip element 102. The image 204 may be, for example, a line showing the current and prior positions of the tip element, or a cursor showing the current position of the tip element.

The host electronic device 200 may be, for example, a drawing tablet computer, a laptop computer, a drawing table, a computer screen, a PDA, a mobile telephone, a gaming device, an electronic reader, a television screen, or other electronic device. The host electronic device 200 incorporates a circuit 206.

Figure 1B:
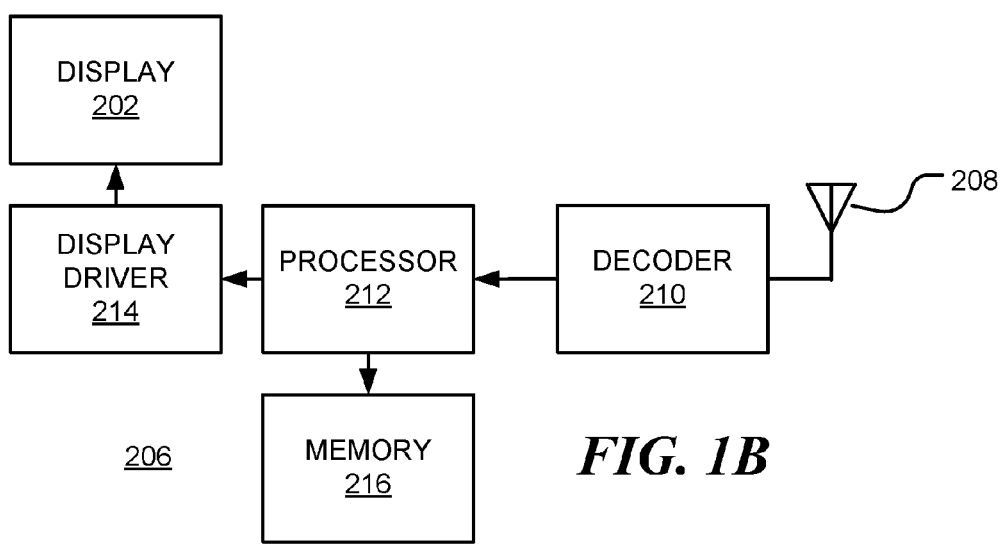
FIG. 1B is a diagram of a circuit of a host electronic device, in accordance with various example embodiments of the present disclosure.

FIG. 1B is a block diagram of the circuit of a host electronic device, in accordance with various example embodiments of the present disclosure. Referring to FIG. 1B, the circuit 206 includes an antenna 208 for wireless communication with a stylus, and a decoder 210 for decoding signals received at the antenna 208. The decoded signals are input to a processor 212 and are used to control operation of an application executing on the processor. The output from the processor, which may be an electronic drawing, for example, is passed to a display driver 214, which drives the display screen 202. The output from the controller may also be stored in a memory 216.

Auxiliary components, such as clocks and a power source, have been omitted for simplicity. These components are well known to those of ordinary skill in the art.

Referring again to FIG. 1A, in a further embodiment, the host electronic device 200 comprises a position detection device that receives or transmits signals from the stylus 100, or both receives and transmits signals. These signals may be used to locate the position of the stylus using properties of the signals, such as time-difference of arrival, direction of arrival or amplitude at a detector array, for example. Such position detection systems are known to those of ordinary skill in the art. The position detection device may be linked to a computer or other electronic device.

In some embodiments, the position of the tip element 102 provides an input to a computer program executing on the processor 206 of the electronic device 200, or on a processor operatively coupled to the electronic device 200. A common use for a stylus is for control of a drawing tool in a computer aided drawing system. In such applications, the stylus replicates drawing tools such as pens and brushes commonly used for drawing. Since the stylus may be used for different tools, a user is provided with methods for selecting different tools and for selecting the attributes of the drawing tools. Examples of drawing tool attributes include line width and color, while brush tool attributes additionally include opacity, grain, angle, jitter, re-saturation, bleed, flow, and depth. These attributes are typically selected by user interaction with a graphical user interface displayed on the visual display screen. A full description of a drawing tool includes a plurality of attributes. The combination of drawing tool attributes defines the setting of the drawing.

Commonly, a computerized drawing tool, such a pen, brush, chalk, spray, etc., has a large number of potential attributes. For example, if each red, green and blue color component is represented by an 8-bit value, there are $2^{24}$ possible colors. In addition, other attributes such as tool type, line width, saturation, opacity etc. may be selected. It is therefore impractical to have a control for each set of attributes, let alone each attribute within the set.

In one embodiment, the one or more controls are used to select drawing tool settings from a list of one or more settings. The list may be ordered and may be accessed cyclically. That is, each time a control is activated, a new description is selected from the list of descriptions. A list of descriptions may be accessed in a cyclic manner.

Figure 2:
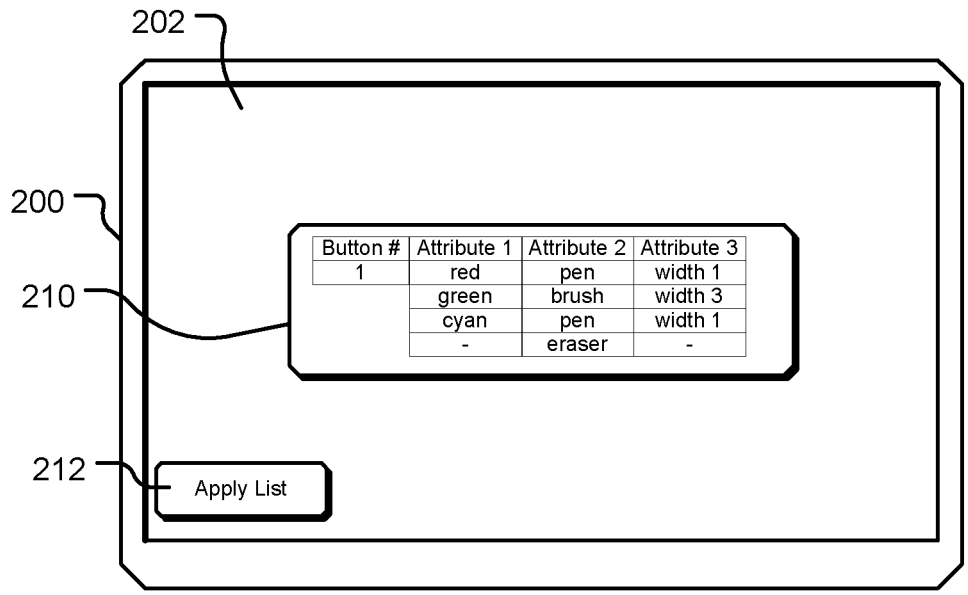
FIG. 2 is a diagram of an example of a user interface displayed on a display screen of a host electronic device, in accordance with various example embodiments of the present disclosure.

In one embodiment, the host electronic device 200 includes a user interface. For example, the user interface may comprise the display screen 202 and an input device. The input device may be, for example, the stylus 100, computer mouse, a keyboard, or a voice interface. Alternatively, the display screen may be a touch screen, such as a capacitive or restive screen. FIG. 2 shows an example of a user interface 210 displayed on a display screen 202 of a host electronic device 200 while operating in a first mode of operation. In the embodiment shown in FIG. 2, the user interface 210 is a data entry form that enables a user to (i) select the button on the stylus to be programmed, (ii) set an ordered list of descriptions. In user interface 210, each row of the table corresponds to a drawing tool setting and each column element in a row corresponds to an attribute. Thus, the first setting is for a red pen with line width 1 unit.

The user interface may take other forms known to those of ordinary skill in the art, such as drop down menus. Attributes may be entered using text, selecting from a list, or dragging from a palette, for example.

Attributes may be entered in a variety of methods. For example, numerical values for color components or line widths may be entered by typing numbers in a form or by using increment/decrement controls. Attributes may also be entered by entering text, selecting from lists, or selecting from palettes. Other methods for entering attributes will be apparent those of ordinary skill in the art.

Figure 3:
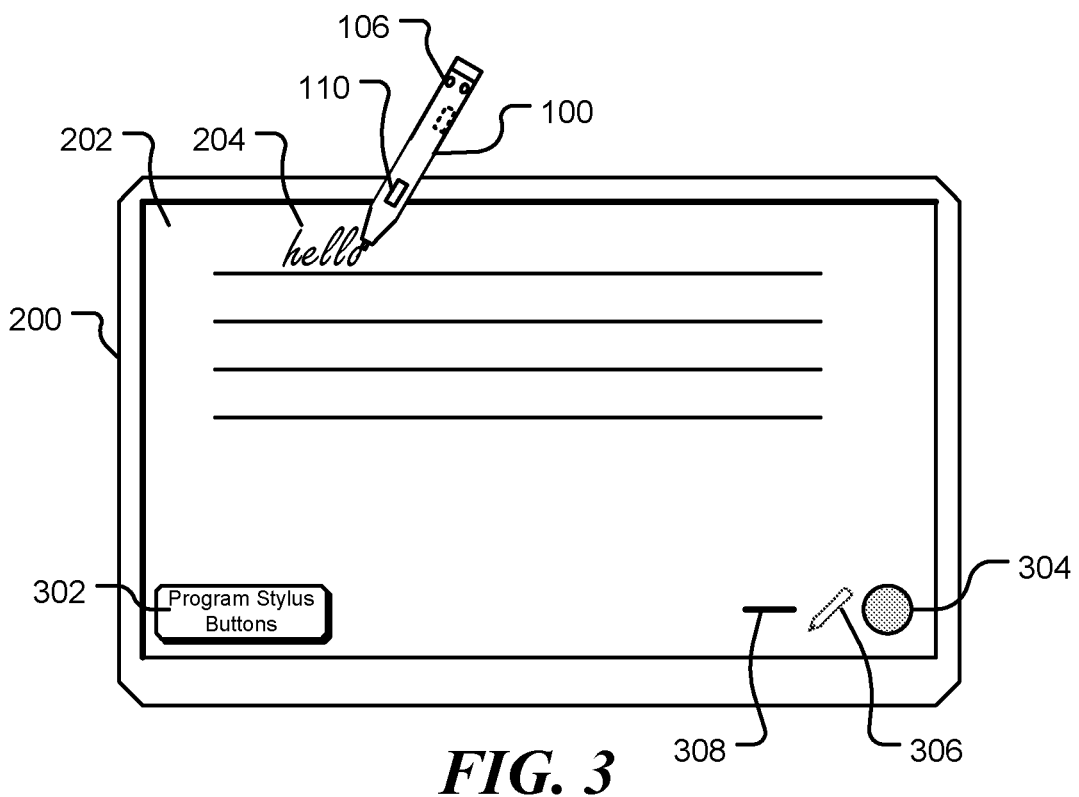
FIG. 3 is a diagram of an example of drawing tool selection using a stylus, in accordance with various example embodiments of the present disclosure.

When the list of settings is complete, the user can select button 212 on the display screen to store the settings and move to a second mode of operation. An embodiment of the second mode of operation is shown in FIG. 3. Referring to FIG. 3, the attributes of the currently selected drawing tool, such as the color 304, tool type 306 and line width 308, are displayed on the display screen 202. Movement of the stylus 100 results in a line 204, with the selected attributes, being displayed on the display screen 202.

To move to the next setting, the user activates control 106 on the stylus which causes a first selection signal to be transmitted from the stylus. When the first selection signal from the stylus is received by the host electronic device it selects, as a primary drawing tool setting, the next drawing tool setting from the first list of drawing tool settings. The one or more drawing tool attributes in the selected primary drawing tool setting are then assigned to the computer drawing tool and may be displayed on the display screen 202. Each time a first selection signal is received, the next setting is selected from the list.

In one embodiment, the list of settings is a cyclic ordered list. Settings in the list are accessed in order and once the last setting list is reached, the next setting is taken to be the first setting in the list.

In this manner, a single control, such as a button 106 on the stylus 100, may be used to select from a list of drawing tool settings. Each setting may comprise one or more attributes. Further, as described above, the list of settings may be customized by user interaction with the user interface. For example, this enables a user to select a palette of colors to be used and the user may move from one palette color to the next by pressing a button on the stylus. As a further example, a user may select, in turn, a red brush, a green brush, a black pen or an eraser by pressing a single button on the stylus.

Thus, in the first mode of operation of this embodiment, a user interface is displayed on a display of the host electronic device to a user of the computer drawing tool and a first list of settings is formed dependent upon user interaction with the user interface. The first list of settings is stored in a memory on the host electronic device or a memory on the stylus, or both. An initial setting is selected from the first list of settings. This may be, for example, the first setting in the list. In a second mode of operation, a first input from the computer drawing tool is received at the host electronic device, the first input being dependent upon user interaction with a first control of the computer drawing tool. Upon receipt of the first input from the computer drawing tool, the next setting in the first list is selected.

In an embodiment where an attribute includes the color of the drawing tool, the selected color may be communicated from the host electronic device to the stylus and displayed on a color indicator 110 of the stylus, so as to indicate to the user which color has been selected.

If a user wishes to change the list of settings, the host electronic device may be returned to the first mode of operation. This may be done, for example, by activating a button 302 displayed on the user interface 202.

Figure 4:
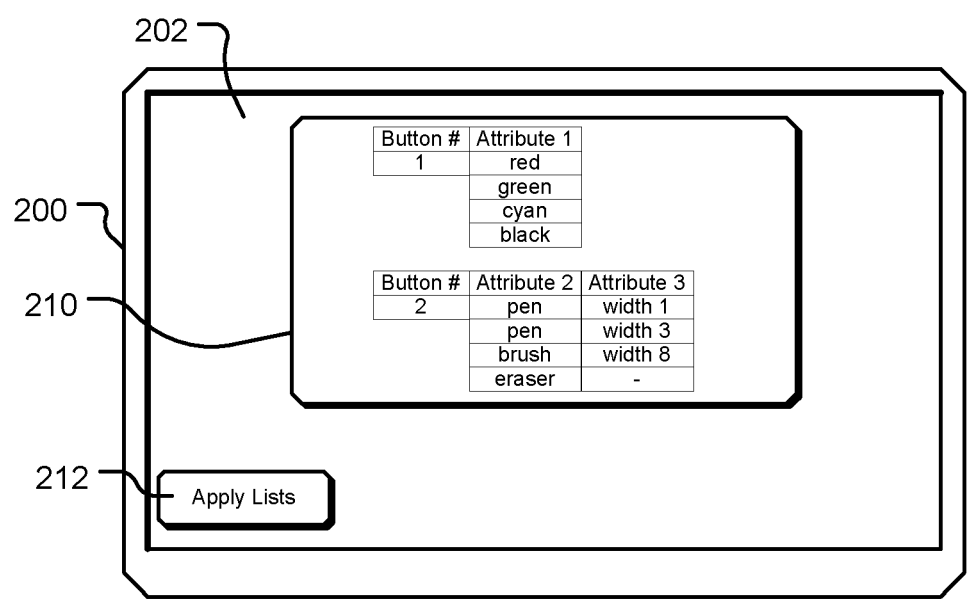
FIG. 4 is a diagram of a further example of a user interface displayed on a display screen of a host electronic device, in accordance with various example embodiments of the present disclosure.

FIG. 4 shows a further embodiment in which the stylus has two or more controls (such as 106 and 108 in FIG. 1). In this embodiment, each control or button controls an associated list of drawing tool settings. That is, the first control selects from a first list of settings and the second control selects from a second list of settings. In the example shown, button 1 controls the color of the drawing tool. The ordered list of colors may be set by user interaction with the user interface 210. Button 2 controls two further attributes, the tool type and the line width. In general, any number of buttons may be used and each list may contain one or more attributes. The full setting of the drawing tool is obtained by combining attributes from the selected settings in each list. For example if button 1 has been used to select 'green', and button 2 has been used to select 'brush width, 8', then the drawing tool is assigned the attributes 'green brush with width 8 units'.

The setting selected from the second list may be combined with the setting selected from the first list to form an augmented setting of the computer drawing tool.

When the first control is activated a first signal is transmitted from the stylus. When the second control is activated a second signal is transmitted from the stylus. The first and second signals are different from one another so that the host electronic device can determine which control has been activated and select a drawing tool setting from the appropriate list of settings. Similarly, when more than two controls are present, each selection signal is distinguishable from the others.

It will be apparent to those of ordinary skill in the art that any attributes may be assigned to the settings, and such attributes are not limited to those attributes described herein.

Figure 5:
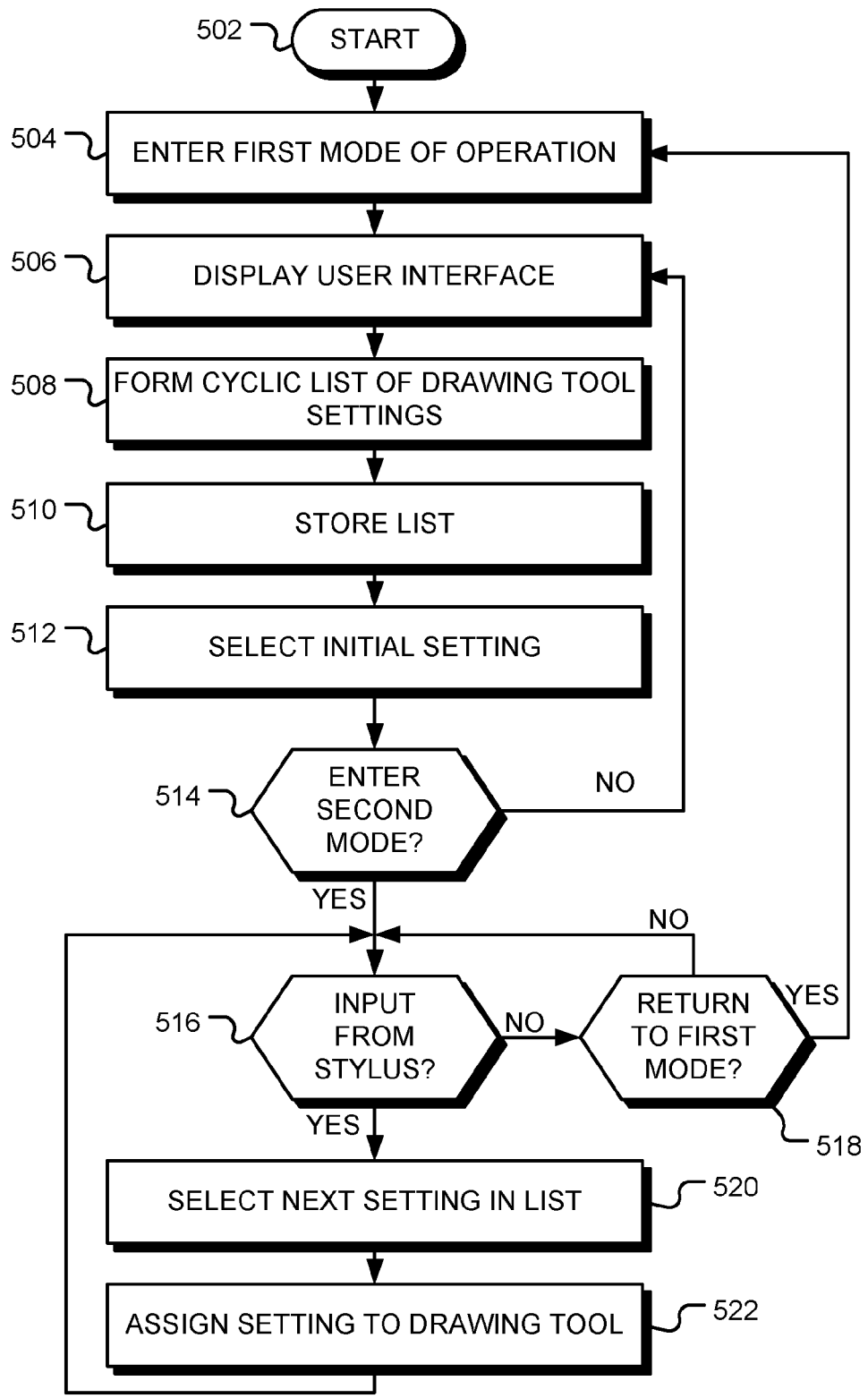
FIG. 5 is a flow chart of a method for selecting a description of a computer drawing tool, in accordance with various example embodiments of the present disclosure.

FIG. 5 is a flow chart of a method for selecting a setting of a computer drawing tool. Following start block 502 in FIG. 5, a host electronic device enters in a first mode of operation at block 504. At block 506 a user interface is displayed to a user of the computer drawing tool. At block 508, a first list of settings is formed dependent upon user interaction with the user interface. The first list of settings is stored at block 510 and at block 512 an initial setting is selected from the first list of settings.

If the user selects to move to a second mode of operation, as depicted by the positive branch form decision block 514, flow continues to decision block 516; otherwise, as depicted by the negative branch from decision block 514, flow returns to block 506 to allow the user to continue to make changes to the list of settings.

In a second mode of operation the host electronic device is responsive to input signals received from user activation of the one or more controls on the stylus. If no input from the stylus is received, as depicted by the negative branch from decision block 516, a check is made at decision block 518 to determine if the user has requested to return to the first operating mode. If so, as depicted by the positive branch from decision block 518, flow returns to block 504. If not, flow returns to decision block 516 to await either stylus input or a request to return to the first operating mode.

If stylus input is received at the host electronic device, as depicted by the positive branch from decision block 516, the next setting in the first list is selected at block 520. The attributes in the selected setting are then assigned to the drawing tool at block 522. The host electronic devices responds dependent upon the position of the stylus and on the setting of the drawing tool. Flow then returns to block 516 to await further user input from the stylus or from the user interface.

As disclosed above, the first control of the computer drawing tool may be a button on the computer drawing tool, or some other control.

A setting in the first list of settings comprises one or more attributes such as color, line width and drawing tool type. Other attributes may be programmed.

The attributes of the selected setting may be displayed on the user interface.

In an embodiment where one of the attributes is color, the selected color may be communicated from the host electronic device to the computer drawing tool and displayed using a color indicator, such as a light emitting diode (LED) for example, of the computer drawing tool.

Figure 6:
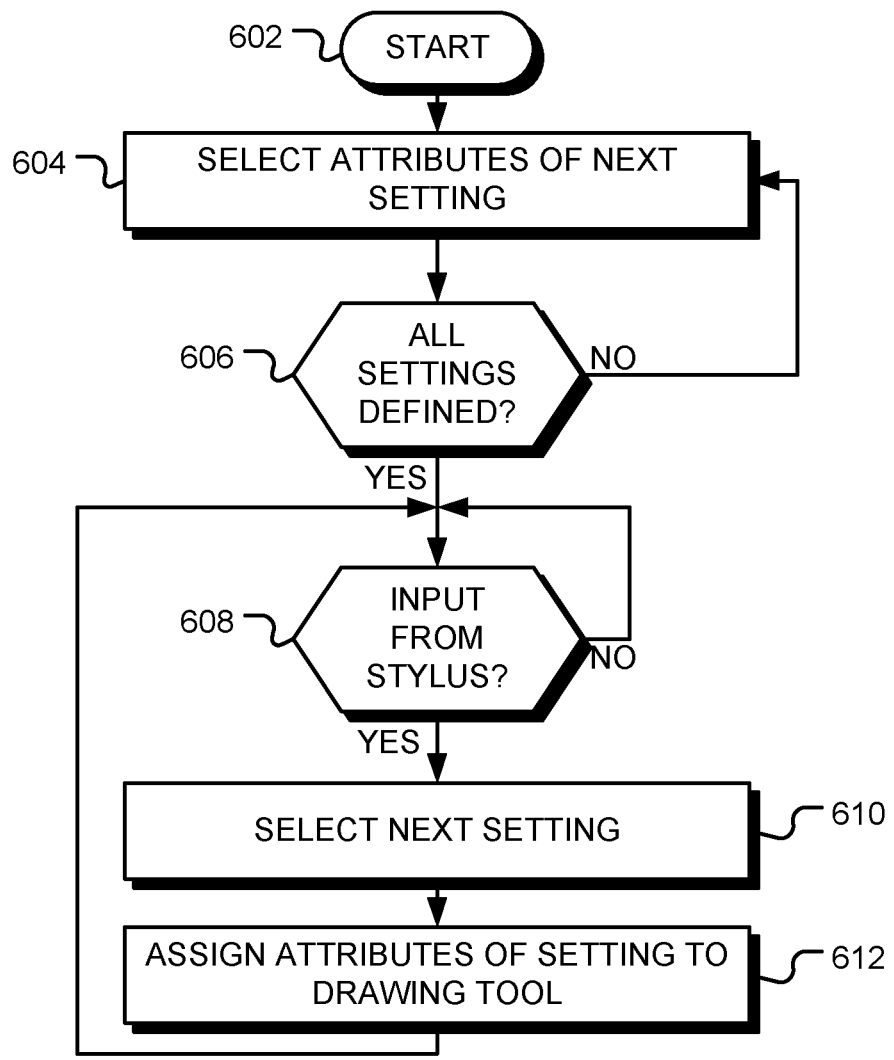
FIG. 6 is a flow chart of a further method for selecting a description of a computer drawing tool, in accordance with various example embodiments of the present disclosure.

FIG. 6 is a flow chart of a further method for selecting a setting of a computer drawing tool. Following start block 602 in FIG. 6, a setting of the computerized drawing tool is selected on a user interface of the host electronic device at block 604. Each setting is defined by a combination of two or more user-selectable attributes. For example, a first setting may be defined by the attributes 'red', 'pen' and 'width 2'. If another setting is to be defined, as depicted by the negative branch from decision block 606, flow returns to block 604 and the next setting is defined. For example, a second setting may be defined by the attributes 'green', 'brush', and 'width 4'. Once all of the one or more settings have been defined, as depicted by the positive branch from decision block 606, flow continues to decision block 608. If an input is received from a stylus, as depicted by the positive branch from decision block 608, the next setting of the one or more settings is selected at block 610, and the attributes of the setting are assigned to the computerized drawing tool at block 612. Flow then returns to decision block 608. The input may be generated by a user activating a control, such as a button, on the stylus. In this manner, each setting of the computerized drawing tool comprises two more user- or more selectable attributes.

The implementations of the present disclosure described above are intended to be examples only. Those of skill in the art can effect alterations, modifications and variations to the particular example embodiments herein without departing from the intended scope of the present disclosure. Moreover, selected features from one or more of the above-described example embodiments can be combined to create alternative example embodiments not explicitly described herein.

Operation of the host electronic device or the stylus may be controlled by a processor, such as a programmed processor executing a program of instructions, an application specific integrated circuit (ASIC), or a field programmable gate array (FPGA), for example.

It will be appreciated that any module or component disclosed herein that executes instructions may include or otherwise have access to non-transient and tangible computer readable media such as storage media, computer storage media, or data storage devices (removable or non-removable) such as, for example, magnetic disks, optical disks, or tape data storage. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the host electronic device or stylus. Any application or module herein described may be implemented using computer readable/executable instructions that may be stored or otherwise held by such computer readable media.

The present disclosure may be embodied in other specific forms without departing from its spirit or essential characteristics. The described example embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A method for selecting the attributes of a computerized drawing tool of a drawing application executed on a host electronic device, comprising:
forming a plurality of first settings in response to inputs from a user interface of the host electronic device, each first setting comprising a plurality of user-selected attributes of the computerized drawing tool;
storing the plurality of first settings in a memory of the host electronic device;
receiving a first signal from a stylus, the first signal generated in response to, and indicative of, a single press of a first button of the stylus; and
each time the first signal is received by the host electronic device from the stylus, cycling through the plurality of first settings of the computerized drawing tool to select a setting of the plurality of first settings and assigning, to the stylus, the plurality of user-selected drawing tool attributes of the selected first drawing tool setting,
whereby the plurality of user-selected drawing tool attributes are selected responsive to the single press of the first button of the stylus.

2. A method in accordance with claim 1, wherein a setting, of the plurality of first settings, comprises one or more attributes selected from the group of attributes consisting of color, line width and drawing tool type.

3. A method in accordance with claim 2, further comprising displaying the selected first plurality of attributes that define the selected setting on the user interface.

4. A method in accordance with claim 1, wherein an attribute of the selected setting comprises a color, the method further comprising:
communicating the color of the selected setting to the stylus; and
displaying the color of the selected setting using a color indicator of the stylus.

5. A method in accordance with claim 1, further comprising:
forming a plurality of second settings in response to inputs from the user interface of the host electronic device, each second setting comprising one or more user-selected attributes of the computerized drawing tool;
storing the plurality of second settings in the memory of the host device;
receiving a second signal from the stylus, the second signal generated in response to, and indicative of, a single press of a second button of the stylus; and
each time the second signal is received by the host electronic device from the stylus, cycling through the plurality of second settings of the computerized drawing tool to select a setting of the plurality of second settings; and
combining attributes of the selected first setting and attributes of the selected second setting to define settings of the computerized drawing tool.

6. A method in accordance with claim 5, wherein a setting of the plurality of second settings comprises one or more attributes selected from the group of attributes consisting of color, line width and drawing tool type.

7. A method in accordance with claim 1, further comprising:
generating a response dependent upon the position of the stylus and the selected first setting of the computer drawing tool.

8. A method in accordance with claim 1, further comprising:
transmitting the first settings to the stylus; and
storing the first settings in a memory of the stylus.

9. A non-transitory computer-readable medium having computer-executable instructions for causing a host processor to:
execute a drawing application having a computerized drawing tool controlled by a stylus;
form a plurality of drawing tool settings of the computerized drawing tool in response to inputs from a user interface, each drawing tool setting comprising a plurality of user-selected drawing tool attributes;
store the plurality of drawing tool settings in a memory of the host processor;
receive a first signal from the stylus, the first signal generated in response to, and indicative of, a single press of a first button of the stylus; and
each time input the first signal is received from the stylus:
select a setting from the plurality of drawing tool settings; and
assign, to the computerized drawing tool, the plurality of user-selected drawing tool attributes of the selected drawing tool setting.

10. A non-transitory computer-readable medium in accordance with claim 9 and having further computer-executable instructions for causing a host processor to:
display an image on a display screen dependent upon the position of the stylus and upon the user-selected drawing tool attributes.

11. A computer drawing system having a display operable to render an image in response to a stylus, the computer drawing system comprising:
an input for receiving a first selection signal from a stylus, the first selection signal generated in response to, and indicative of, a single press of a first button of the stylus;
a memory;
a host electronic device operable to form a plurality of primary drawing tool settings dependent upon user interaction with a user interface, each primary drawing tool setting comprising a combination of a plurality of user-selected drawing tool attributes, operable to store the plurality of primary drawing tool settings in the memory, and further operable, in response to the first selection signal, to select a setting of the plurality of primary drawing tool settings as a primary setting and assign the plurality of attributes of the selected setting to the stylus,
wherein the selection is independent of the image rendered on the display, and
whereby the plurality of user-selected drawing tool attributes are selected responsive to the single press of the first button of the stylus.

12. A computer drawing system in accordance with claim 11, further comprising:
a display screen operable to display the user interface and further operable to display an image dependent upon the position of the stylus and dependent upon the drawing tool attributes of the selected primary setting.

13. A computer drawing system in accordance with claim 12, wherein the display screen is further operable to display the selected primary setting.

14. A computer drawing system in accordance with claim 11, further comprising:

a stylus comprising:
 a housing;
 a drawing tip extending from one end of the housing;
 a communication unit in the housing; and
 a first button operable to cause the communication unit to transmit the first selection signal upon a single press of the first button.

15. A computer drawing system in accordance with claim 14, wherein an attribute of the selected primary setting comprises a color and wherein the stylus further comprises:
 a color indicator operable to display the color of the selected primary setting.

16. A computer drawing system in accordance with claim 15, wherein the host electronic device further comprises a communication unit operable to receive the first selection signal from the stylus and operable to transmit the color of the selected primary setting to the stylus.

17. A computer drawing system in accordance with claim 14, wherein the stylus further comprises:
 a second button operable to cause the communication unit to transmit a second selection signal upon a single press of the second button,
wherein the host electronic device is further operable to select a secondary setting from a plurality of secondary drawing tool settings upon receipt of the second selection signal, where each secondary drawing tool setting comprises one or more drawing tool attributes.

18. A computer drawing system in accordance with claim 14, wherein the stylus further comprises a color indicator operable to display a color in response to a color signal received by the communication unit from the host electronic device and wherein at least the first selection signal causes the host electronic device to select a next color from a list of colors and wherein the color signal is generated dependent upon the selected next color.

19. A computer drawing system in accordance with claim 14, further comprising:
 a second button operable to cause the communication unit to transmit a second selection signal to the host electronic device upon a single press of the second button.

20. A computer drawing system in accordance with claim 14, further comprising:
 a means for detecting the position of the drawing tip.

21. A computer drawing system in accordance with claim 14, wherein the first button comprises a button located on the housing of the stylus.

* * * * *